United States Patent [19]

Stalter, Sr.

[11] Patent Number: 4,861,538
[45] Date of Patent: Aug. 29, 1989

[54] METHOD FOR MOLDING COMPOSITE METAL-ELASTOMER WHEELS

[75] Inventor: Robert J. Stalter, Sr., Bowling Green, Ohio

[73] Assignee: Motor Wheel Corporation, Lansing, Mich.

[21] Appl. No.: 196,019

[22] Filed: May 19, 1988

Related U.S. Application Data

[62] Division of Ser. No. 15,165, Feb. 17, 1987, Pat. No. 4,786,027.

[51] Int. Cl.$^4$ .................. B29C 37/02; B29C 39/10
[52] U.S. Cl. .................................. 264/161; 249/52; 264/163; 264/267; 264/328.9; 301/37 P
[58] Field of Search ............... 264/46.6, 46.7, 46.9, 264/163, 328.9, 328.12, 334, 267, 268, 161; 301/37 P, 37 CM; 249/52

[56] References Cited

U.S. PATENT DOCUMENTS 3,293,694 12/1966 Taylor, Jr. ................. 425/129.1
3,815,200 6/1974 Adams ..................... 264/46.4
4,465,651 8/1984 Godschalk, Jr. ............. 264/328.9

Primary Examiner—James Lowe
Attorney, Agent, or Firm—Barnes, Kisselle, Raisch, Choate, Whittemore & Hulbert

[57] ABSTRACT

Method for molding a composite metal-elastomer styled wheel in which a middle mold part consists of a metal wheel disc and rim subassembly. A base mold part seats against the outboard face of the metal wheel in the closed condition of the mold and has a mold cavity surface to provide an ornamental configuration for the outboard face of the plastic body of the composite wheel. There is a clamp which includes a funnel adapted for registry with a liquid reaction mixture injection nozzle coupled with injecting mixing apparatus. The funnel has a nozzle passage registering with a pour opening in the disc in the closed condition of the mold. A sprue pin is affixed to the base mold part in juxtaposed relation to the disc pour opening and cooperates with the margin of the pour opening to define a restricted access opening to the mold cavity during the injection pour of the urethane reaction mixture. The sprue pin is operable to restrict back-flow of the reaction material during gelation of the same in the cure cycle. The sprue pin and disc in the vicinity of the pour opening define a zone of weakness in the cured urethane reaction mixture operable to induce fracture in the zone upon separation of the base mold part from the middle part to thereby cause cleavage of the urethane reaction material adjacent the inboard surface of the middle mold part.

4 Claims, 2 Drawing Sheets

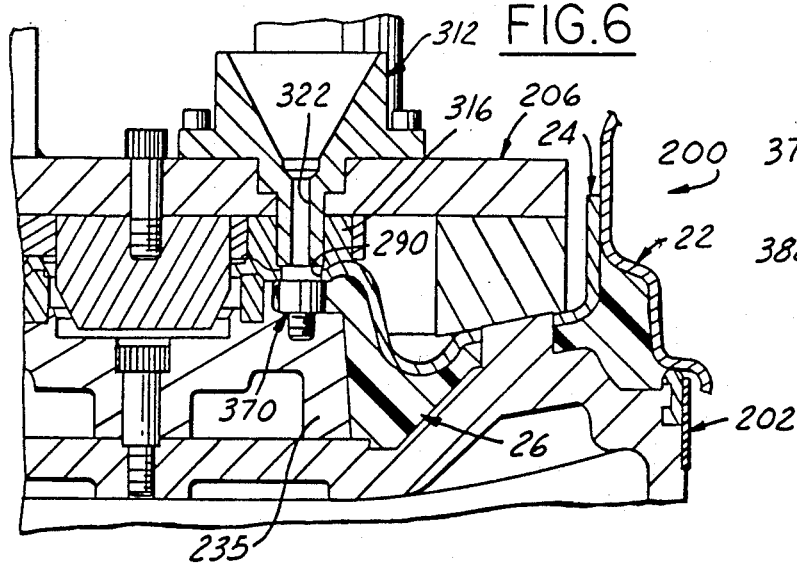
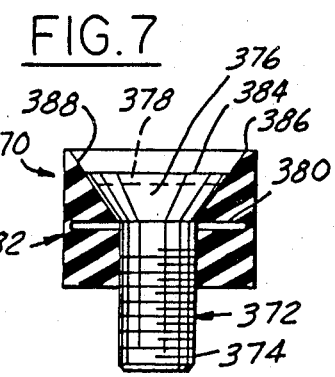
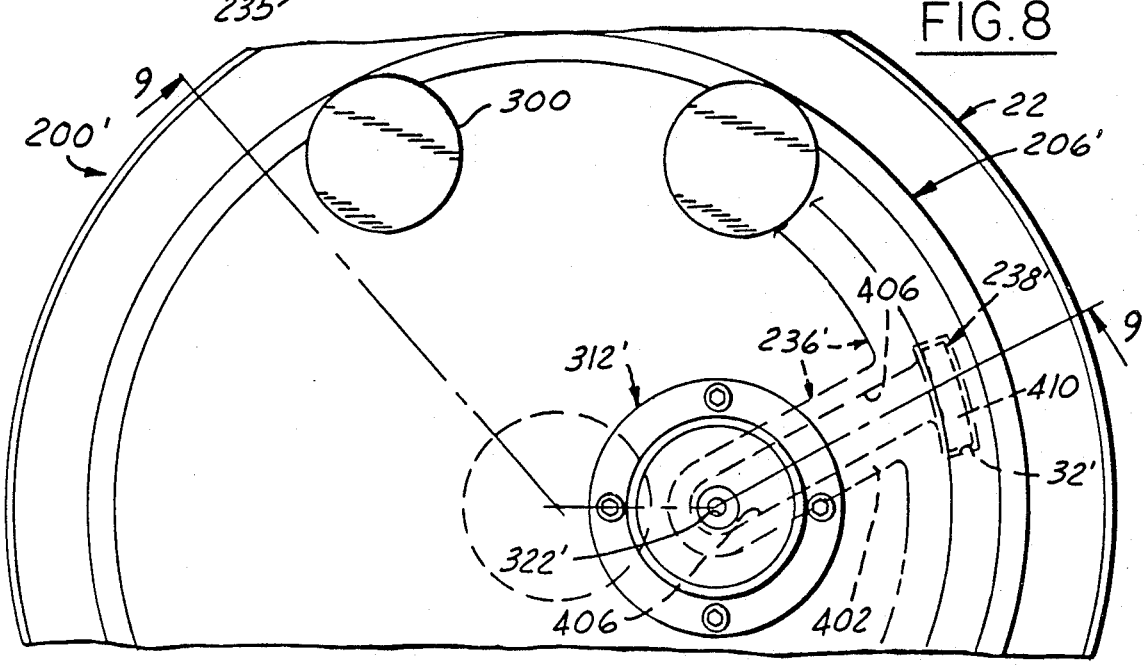
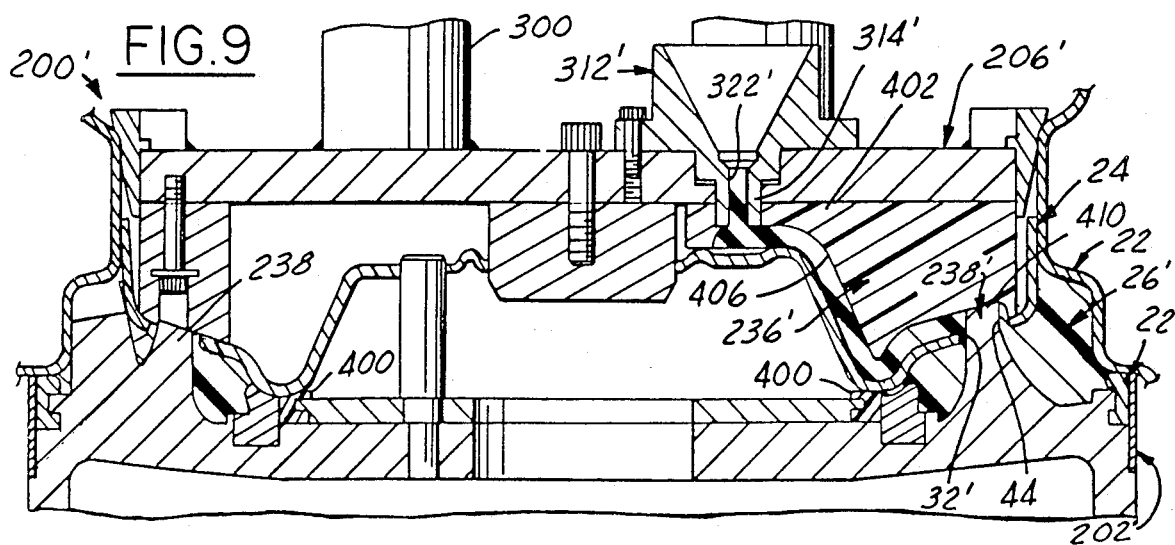

METHOD FOR MOLDING COMPOSITE METAL-ELASTOMER WHEELS

This is a division of co-pending application Ser. No. 015,165 filed on Feb. 17,1987, now U.S. Pat. No. 4,786,027.

This invention relates to wheels for vehicles of the composite metal-elastomer styled automotive-type with a three-dimensional deeply contoured ornamental outboard face, and more particularly to molding apparatus and method for constructing such a wheel.

In the early 1970's Motor Wheel Corporation of Lansing, Mich., assignee of applicant herein, as well as its then parent company, The Goodyear Tire & Rubber Company of Akron, Ohio, developed and introduced an improved form of composite metal-elastomer styled wheel marketed under the registered trademark "POLYCAST". Such styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in-situ as a homogeneous one-piece body or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the previous deep drawn styled all-steel wheels.

Various embodiments of such "POLYCAST" wheels, as well as methods and apparatus for producing the same, are set forth in the following United States Patents assigned either to the assignee herein or its parent, The Goodyear Tire & Rubber Company, which are incorporated herein by reference:

| No. 3,669,501 | 6/1972 | Derleth |
| No. 3,756,658 | 9/1973 | Adams |
| No. 3,762,677 | 10/1973 | Adams |
| No. 3,815,200 | 6/1974 | Adams |
| No. 3,918,762 | 11/1975 | Hampshire |
| No. 3,794,529 | 2/1974 | Thompson |
| No. 3,935,291 | 1/1976 | Jackson |
| No. 3,956,451 | 5/1976 | Adams |
| No. 4,398,770 | 8/1983 | Smith |

Other prior art patents issued to unrelated parties and directed to various facets of such styled composite metal and plastic wheels include U.S. Pat. Nos. 3,823,982 and 3,998,494 as well as British Patent 1,290,946 (1972).

In one embodiment of the manufacture of such POLYCAST wheels, a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in-situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be constructed from a lower density microcellular closed cell urethane elastomer adhesive material. The urethane material is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

Hitherto, it has been customary in the commercial practice of molding the aforementioned "POLYCAST" wheels to provide in conjunction with the upper mold part a pour nozzle having a funnel-shaped entrance throat leading downwardly into a stem or neck portion having a reduced diameter cylindrical gate passage coaxial with the nozzle throat. The stem is surrounded by an annular elastomeric seal which registers and seals with the margin of a pour opening in the steel disc wheel. During the molding operation a special urethane mixing head nozzle is lowered onto the pour nozzle throat and the urethane reaction mixture is mixed in the mixing nozzle under relatively high pressure, say on the order of 2,000 pounds per square inch, and injected therefrom into the pour nozzle under a regulated exit pressure of about 50 pounds per square inch to thereby force the urethane reaction mixture into the mold cavity. At a predetermined time after the mixture has filled the cavity, the mixing head is retracted.

Once the injected mixture has cooled and cured sufficiently for de-molding, the upper mold part, along with the pour nozzle carried thereon, is separated from the inboard side of the disc of the wheel by raising the same therefrom. Since the pour nozzle is also filled with the urethane reaction mixture at the completion of the injection cycle, a solidified riser or sprue is likewise formed therein. Customarily, this excess urethane material will break off, during mold separation or opening, inside the upper end of the nozzle sprue passage at a weakness plane adjacent the junction of this passage with the funnel throat portion of the nozzle, leaving a cylindrical sprue attached to the cavity urethane material which projects inboard axially from the inboard face of the disc distance on the order of 1 or 1¼ inches. Thus, after de-molding of the wheel, it has hitherto been necessary to process the same through a buffing operation in order to remove the projecting sprue or riser from the inboard face of the wheel backbone.

Another related problem occurs because the entrance to the molding cavity of the wheel mold is open to the sprue and funnel cavities of the pour nozzle. Hence, a substantial amount of "blow back" of the reaction material can occur into these cavities as the urethane reaction material expands during cure and gelation is taking place. This blow back can also cause excessive material to be present on the inboard face of the cast wheel which must be removed, as indicated above, thereby further adding to material and processing cost. Moreover, since there is a need to keep the mold cavity "packed" to some extent to obtain the proper overlay body density to produce a good product, excessive blow-back can cause defects due to insufficient packing.

A further problem related to the above occurs in the construction of certain styles of POLYCAST wheels wherein the urethane decorative body has a very wide (radially) center opening so that the inner periphery of the urethane body material is disposed radially outwardly of and distant from the center area of the steel disc. With this "wide-open-center" styling the entire central bolt hole mounting portion and continguous portions of the disc "hat" or crown may thus be devoid of urethane. Accordingly, in these constructions, it is not possible to inject the urethane mixture through a pour hole located in the disc bolt hole circle area. Injection through an alternative disc entrance to the mold cavity is thus needed, while still retaining the same mold back-up clamp and pour nozzle construction to reduce manufacturing cost.

Accordingly, an object of the present invention is to provide an improved method of making a composite metal-elastomer wheel construction of the aforementioned POLYCAST styled wheel type which overcomes the aforesaid problems of excessive sprue risers, eliminates extra finishing steps, overcomes the aforementioned "blow back" problems, and is usable in producing a wide variety of overlay body designs, including "wide-open-center" types.

Another object is to provide improved mold apparatus for practicing the aforementioned improved method which is economical in construction and reliable in operation.

The invention, together with additional objects as well as features and advantages thereof, will become apparent from the following detailed description and the appended claims taken in conjunction with the accompanying drawings, wherein:

FIG. 6 is a fragmentary vertical sectional view taken on the line 2—2 of FIG. 2 but illustrating a third embodiment of a sprue pin in accordance with the invention.

FIG. 7 is an enlarged vertical part-elevational and part-sectional view of the sprue pin of FIG. 6 shown by itself.

FIG. 8 is a fragmentary top plan view of a fourth embodiment of mold apparatus provided in accordance with the present invention.

FIG. 9 is a vertical cross-sectional view taken on the like 9—9 of FIG. 8.

Figure 1:
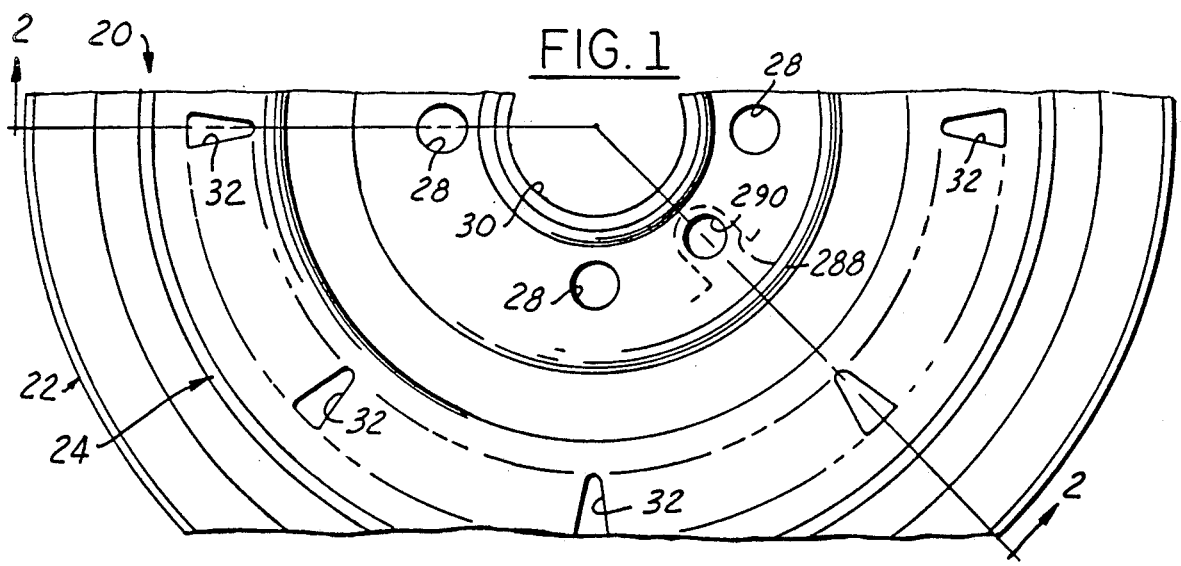
FIG. 1 is a fragmentary top-plan view of the inboard side of a metal disc and rim subassembly employed in the construction of a composite metal-elastomer styled wheel in accordance with the method and apparatus of the present invention.

Referring in more detail to the accompanying drawings, FIGS. 1 through 4 illustrate a first embodiment of the improved apparatus for practicing the improved method of the invention for constructing a composite metal-elastomer styled wheel of the aforementioned type. The wheel is generally designated at 20 and comprises, by way of a preferred example, a conventional drop center steel rim 22, a central steel disc or body 24 permanently secured, as by welding, to the rim, prior to the molding operation. Wheel 20 also includes an ornamental three-dimensional contoured overlay, generally designated at 26 (FIG. 2), secured to the outboard face of disc 24 and to the outboard surface of rim 22. Disc 24 is provided with a circle of bolt holes 28 and a central wheel spindle aperture 30 so that wheel 20 can be removably attached to a wheel hub and associated disc brake or drum brake assembly. For decorative purposes and for brake ventilation, a plurality of cut-outs or vent holes 32 are provided in disc 24 (only five of a circular array of 24 such holes being shown in FIG. 1). The particular configuration of the steel components of wheel 20, including rim 22 and disc 24, may follow solely utilitarian considerations such as strength of the wheel and ease and economy of manufacture, since the aesthetic appearance of the wheel is determined largely by the three-dimensional contour of the ornamental overlay 26. The three dimensional contours of overlay 26 in turn are determined by the particular ornamental or aesthetic appearance desired by the designer of wheel 20.

Figure 2:
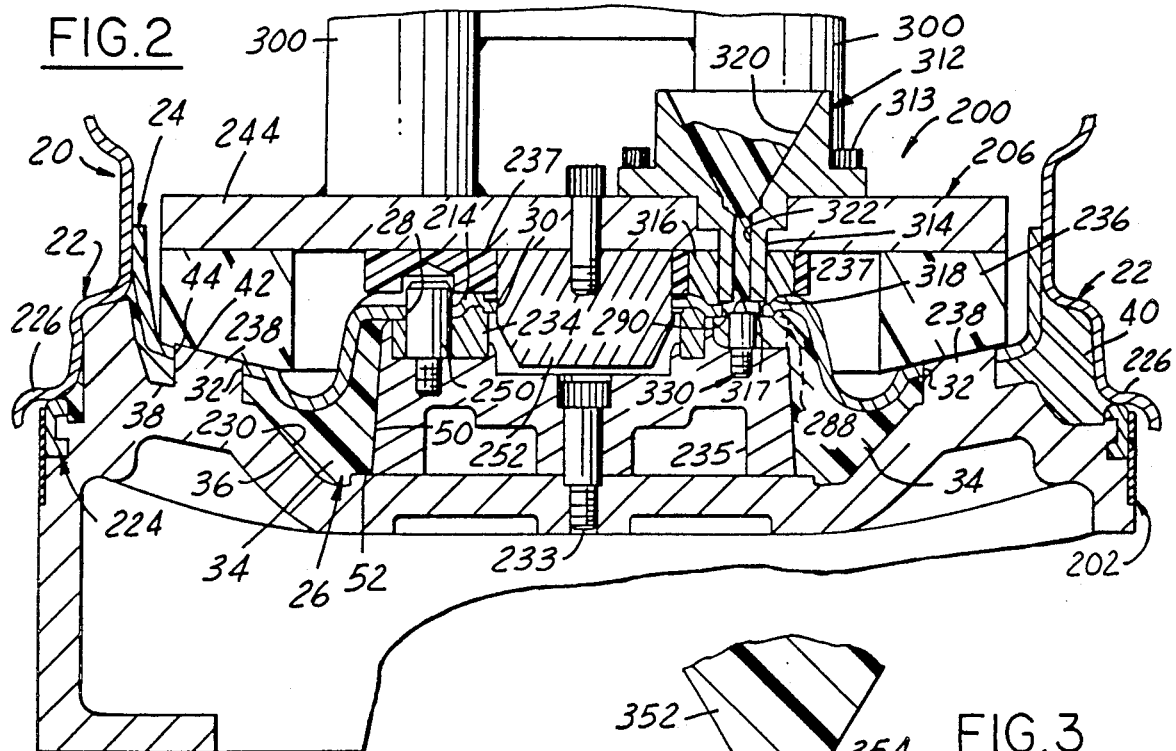
FIG. 2 is a vertical cross-sectional view taken on the line 2—2 of FIG. 1 but also showing the upper and lower mold parts juxtaposed in assembly to the disc and rim subassembly and provided with a first embodiment of a sprue pin in accordance with the present invention.

In the ornamental exemplary design of FIGS. 1 and 2, overlay 26 has a central annular section 34 with a generally smooth frusto-conical outer face 36, and a plurality of fins 38, which radiate outwardly from section 34 to an outer annular peripheral portion 40. Pockets 42 are provided between each adjacent pair of fins 38 which extend axially inboard to provide a urethane aperture 44 within each disc aperture 32. Section 34 of overlay 26 has an internal, slightly frusto-conical wall 50 diverging outboard axially of the wheel and terminating at an axially inset hub cap seating surface 52. Wall 50 defines a relatively large cavity in the center of overlay 26 and is adapted to receive the vehicle wheel spindle therein in a mounted condition of wheel 20.

Figure 4:
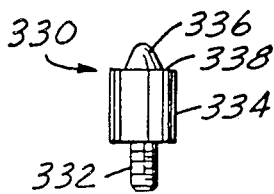
FIG. 4 is a vertical elevational view of the first embodiment of the sprue pin provided in accordance with the present invention shown by itself.
Figure 3:
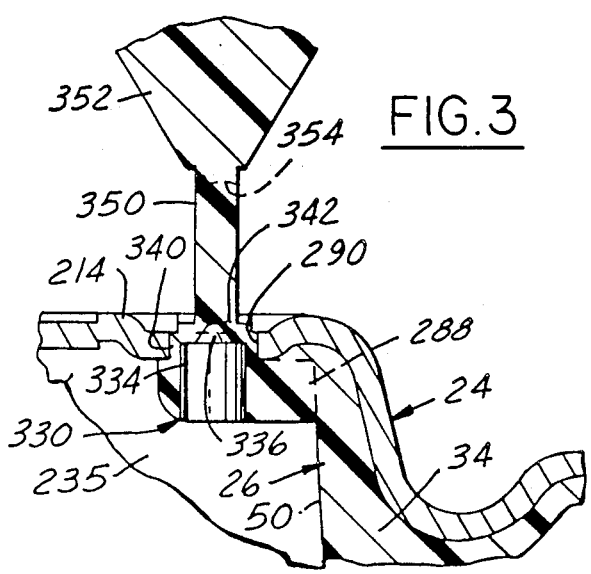
FIG. 3 is a fragmentary sectional view illustrating the sprue pin and associated riser pip formed during reaction injection molding of the wheel, this view being enlarged over the corresponding portion of FIG. 2 to better illustrate detail.

FIGS. 2–4 also illustrate an improved molding apparatus, and improved method of making wheel 20 utilizing such apparatus, in accordance with the invention, which incorporate many of the features of the molding apparatus and method illustrated in conjunction with FIGS. 7 through 11 of the aforementioned Adams U.S. Pat. No. 3,762,677, which is incorporated herein by reference. Likewise, the molding apparatus or mold 200 described in columns 11–16 of the '677 patent is incorporated herein by reference, and identical reference numerals are employed in FIGS. 2 and 3 to identify elements alike in structure and/or function.

Mold apparatus 200 thus comprises the three main components: namely, a lower mold part 202 (FIG. 2), the metal wheel subassembly 22-24, and an upper mold half 206 which serves as a backup support for clamping wheel 22-24 onto mold part 202. Lower mold part 202 has an annular lip in the form of a resilient seal 224 adapted to seat against an annular portion of the outboard face of rim 22. Mold part 202 also has a surface 230 on its upper side radially inwardly of seal 224 adapted to define, with the outboard face of wheel subassembly 22-24, a mold cavity in which the decorative plastic overlay 26 is cast, the same being suitably contoured to provide the ornamental configuration to form the outboard decorative face 36, 38 of wheel 20.

To assemble mold 200, wheel subassembly 22-24 is placed against lower part 202 as shown in FIG. 2 with the outboard tire bead-retaining flange 226 of rim 22 resting on or in light contact with seal 224. This also lightly seats the bolt circle portion 214 of disc 24 against an annular inner seal 234 mounted on the upper face of a mold pedestal 235 which in turn is seated on the center of face 230 of mold part 202 and removably secured thereto by a stud 233. Pedestal 235 provides a core to form the wall 50 defining the wheel well cavity in the center of overlay 26. Seal 234 is adapted to seal the mold cavity around its inboard inner perimeter in the fully seated condition of wheel subassembly 22-24 on mold part 202.

Upper mold part 206 has two pairs of upright posts 300. These posts in turn are fastened to a suitable molding press ram for raising and lowering of upper mold part 206 as will be well understood in the art. This apparatus is used to urge upper mold part 206 downwardly against wheel subassembly 22-24 as shown in FIG. 2 to clamp mold 200 in its fully closed position.

Mold part 206 has a resilient annular pad 236 having a configuration on its underside adapted to seat against the inboard face of disc 24 in overlying relation to disc vents 32 and associated core protrusions 238 of lower mold part 202 to thereby force the disc-rim subassembly 22-24 further toward part 202 and then retain parts 202 and 22-24 in sealing engagement. A steel funnel 312 is secured by bolts 313 onto the upper surface of clamp plate 244 and has a coaxial neck 314 which extends downwardly through a washer seal 316 disposed within seal 237, the lower end face 317 of neck 314 being disposed slightly above or in recessed relation to the lower end face 318 of washer seal 316. Disc 22 is provided with a pour opening 290 between a pair of adjacent bolt holes 28 therein. Neck 314 of funnel 312 and washer seal 316 are positioned for coaxial registry with pour opening 290, and the lower face 318 of seal 316 seats in sealed relation on the inboard face of disc 22 around the margin of opening 290. Pedestal 235 has a notch 288 (indicated in phantom by dash lines in FIG. 1) in its upper surface which registers with pour opening 290 and funnel neck 314 to serve as a sprue for directing the liquid urethane reaction mixture into the mold cavity during pouring of the mold.

Lower mold part 202 has a locating pin 250 affixed to and protruding upwardly from pedestal 235 parallel to the wheel axis which protrudes through an associated one of the disc bolt holes 228 in the closed condition of the mold for angularly locating the rim disc subassembly 22-24 accurately on the lower mold part 202. Upper mold part 206 has a central locating core 252 projecting through the disc center opening 30 and into the space below disc 24, core 252 having a close clearance fit with disc center hole 30 to thereby center the metal wheel subassembly 22-24 relative to the upper mold part 206 in the closed condition of the mold 200.

Funnel 312 has a conical throat portion 320 downwardly convergent and communicating with a coaxial cylindrical neck passage 322 which opens at its lower end at face 317 of neck 314. In accordance with the principal feature of the present invention, instead of the previous unrestricted communication of passage 322 via a circular disc opening with the sprue notch passage 288 in pedestal 235, a predetermined annular orifice is provided in the form of a sprue pin 330 (FIGS. 2, 3 and 4) interposed in disc pour opening 290. Pin 330 has an extending threaded mounting shank 332, a cylindrical mid-portion or body 334 and a tapering, bullet shaped nose 336. Sprue pin 330 is mounted on pedestal 235 by screwing pin 332 into a threaded socket located in the bottom wall of the sprue passageway 288, as best seen in FIG. 2. The length and diameter of pin body 334 is sized to position the radially extending upper surface 338 of the body within the disc pore opening 290 between the planes of the inboard and outboard surfaces of the disc 24. Pin 330 is coaxially aligned with opening 290 as well as funnel neck passage 322.

As best seen in the enlarged view of FIG. 3, the outer surface of pin body 334 and the inner cylindrical wall of pore opening 290 define an annular passageway 340 therebetween having a given flow controlling cross-sectional area. Similarly, the surface of pin nose 336 is dimensioned to have its tip protrude slightly upwardly into the outlet end of funnel passage 322 so as to define therebetween another annular passageway 342. The predetermined clearances 340 and 342 are selected to cause a flow restriction for the incoming liquid urethane reaction mixture during filling of the mold cavity which does not prolong the previous two-second fill time for the mixture to enter and fill the mold cavity, taking into consideration the viscosity of the mixture and the available injection pressures. To this end the small annular orifices 340 and 342 are designed to be of the same cross-sectional area normally provided with the prior open circle pour opening in the disc.

However, as contrasted to such prior circular pour hole, these annular orifices have a small radial dimension between their inner and outer concentric surfaces. Hence, once the mold cavity becomes substantially filled, and the urethane reaction mixture starts to cure such that gelation takes place, the solidifying particles of urethane tend to block reverse flow through these narrower annular orifices to thereby prevent reverse flow and escape of the urethane from the mold cavity. Hence the sprue pin of the present invention helps overcome the previous "blow-back" problem of a circular pore opening, which has previously posed difficulty, in two respects: (1) it reduces or eliminates the excess material previously present on the inboard face of the cast wheel which heretofore had to subsequently be removed in a finishing operation, thereby reducing material and processing costs; and (2) the restriction to back flow keeps the mold cavity "packed" to some extent in order to obtain the proper density to produce a good product, whereas excessive blow-back can cause a weakness in this respect. Moreover, by utilizing sprue pin 330 the injection nozzle of the mixing head can be removed from funnel 312 at an earlier point in the processing cycle, permitting the mold assembly to be transferred from the fill station to a cure station and replaced with another empty mold assembly in a faster sequence, thereby increasing production efficiency.

After the injection filled mold assembly has been allowed a sufficient time to complete the cure of the urethane reaction mixture forming the ornamental overlay 26, mold 200 is opened by raising upper mold half 206 to separate the same from disc and rim subassembly 22-24. Before this occurs, it will be noted that a riser of solidified and cured urethane reaction material will have formed in the funnel neck passage 322 and funnel throat 320. This riser is best illustrated in FIG. 3 and consists of a stem 350 and a conical head 352 (funnel 312 being omitted for clarity). With the prior mold apparatus utilizing an unrestricted circular pour opening, during the initial upward motion of upper mold clamp 206 the riser would, under the stretching stress of mold separation, fracture at a point of weakness generally indicated by the dash line 354 in FIG. 3, close to the junction of stem 350 with head 352. The severed portion of stem 350 remaining attached to the main body of the urethane material 26 via disc opening 290 thus represented a projection of scrap material which had to be removed in a subsequent finishing operation.

However, with the provision of sprue 330 of the invention, the annular orifices 340 and 342 create two planes of weakness in the urethane material respectively within and adjacent the disc opening 290. Accordingly, upon initial raising of upper mold half 206, fracture or tear separation of stem 350 from the main body 226 of urethane material will occur either within opening 290, slightly thereabove, or in a zone between these two planes of weakness. Hence, removal of upper mold half 206 will result in separation of the waste material 350 and 352 at or near the inboard face of disc 24, thereby materially reducing or eliminating the need for a subsequent finishing operation. The separated riser 350, 352 is cleared from funnel 312 by forcing the same upwardly therefrom in the manner as substantially heretofore performed, thus adding no further complications to processing. When the disc and rim subassembly 22-24, with the ornamental plastic body 26 adhered thereto, is separated from the lower mold part 202, sprue pin 330 will be withdrawn from body 26, leaving a complemental cavity in the outboard face of body 26. However this cavity is located radially within the center cavity of body 26 defined by mold pedestal 235 and hence will not be visible in use because this central area of the wheel assembly is typically covered by an ornamental hub cap or the like detachably mounted to overlay 26.

Figure 5:
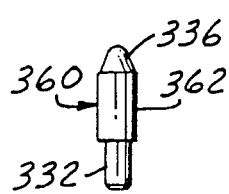
FIG. 5 is a vertical elevational view of a second embodiment of the sprue pin of the invention shown by itself.

Referring to FIG. 5, a second embodiment of a sprue pin 360 is illustrated by itself, pin 360 being provided with the same nose 336 and threaded shank 332 as pin 330. However the central body portion 362 of pin 360 is substantially reduced in diameter relative to body 334 in order to adapt sprue pin 360 to a disc pour opening having a correspondingly reduced inside diameter. Such variations in the diameters of disc pour openings occasionally occur in the construction of "POLY-CAST" wheels as may be necessary to accommodate different wheel designs. In any event, it will be understood that the diameter of body portion 362 is selected relative to the inside diameter of the disc pour opening to define the annular restriction 340 there between, whereas the dimension of pin nose 336 need not be altered to define the annular restriction 342 because the same size funnel 312 is used in all applications.

A third embodiment of a sprue pin and associated mold apparatus in accordance with the present invention is illustrated in FIGS. 6 and 7. In this embodiment a modified sprue pin 370 is provided which mounts in the mold apparatus 200 in the same manner as sprue pin 330. Sprue pin 370 thus comprises a fillister head screw 372 having a threaded shank 374 which screws into the threaded socket in pedestal 235, and a conical head 376 provided with a screw driver cross slot 378. A steel washer 380 is received on shank 374 so as to abut head 376. Washer 380, a portion of screw shank 374 and screw head 376 are encapsulated in an annular body 382 made of a suitable elastomeric material, such as silicone rubber, to form a permanent assembly. The upper surface 384 of screw head 376 is slightly recessed relative to the upper surface 386 of body 382. Preferably body 382 has a conical throat 388 complimentary to screw head 376 and extending therebeyond to a junction with surface 386 such that the upper edge of body 382 defines a narrow annular flexible lip.

Pin 370 is dimensioned such that when installed on pedestal 235 as shown in FIG. 6, the upper surface 386 of the silicon rubber head 382 in its relaxed free state condition is positioned within a tolerance range defined by a slight clearance with the outboard face (underside) of disc 24 to a contacting, slightly compressed sealing condition therewith, depending upon the tolerance ranges and build-up of the various parts employed to construct mold assembly 200. Due to the soft, pliable nature of the silicone rubber of body 382, head 382 cannot be damaged when placing the rim-disc 22-24 subassembly onto the lower mold part 202. The lip 386 of body 382 will either touch or come very close to the outboard face of disc 24 in the fully closed condition of mold upper half or clamp 206. The outside diameter of head 382 is made slightly larger than the inside diameter of the disc opening 290 so as to radially overlap the margin of opening 290.

Regardless of whether upper lip 386 of body 382 is touching the disc metal around opening 290, or spaced with a very slight clearance therefrom, when the liquid reaction mixture is injected via funnel 312 into and through pour opening 290, the silicone rubber material of head 382 is soft enough so that the lip area 386 of the head will deflect under the flow injection pressure, thereby allowing the reaction mixture to flow into the mold cavity at a satisfactory rate. Although pin 370 thus may define in a non-pour condition a closed passageway or a much more restricted annular orifice than is the case with pin 330, nevertheless in its deflected condition in the injection pour state the same does define an adequately open annular restricted passage between lip 386 and the juxtaposed outboard face of disc 24 around the margin of opening 290. Pin 370 thus does cause a slight increase in back pressure as compared to pin 330, but it has been found that this slight increase in back pressure improves the mixing of the initial flow of reaction injection material from mixing head. After the pour has been completed, the resilience of the material of head 382 causes the same to return to its normal free state condition, either contacting or slightly spaced from the disc. It also has been found that back flow of the reaction mixture is prevented in a manner similar to, but improved over, the results obtained with pin 330. Moreover, utilizing the modified sprue pin 370 creates a thin section weakness fracture zone in the solidified urethane material in the vicinity of the lip 386 which causes riser 350 to break off at this point upon raising of upper mold half 206 from the disc-rim subassembly 22-24. Hence, no excess cured material protrudes from the inboard side of the disc, thereby again eliminating a subsequent scrap removal operation.

Another advantage of the modified sprue pin 370 relative to sprue pin 330 has been found to result when the same is used with a thin-film mold release sheet. It has been customary hitherto in commercial use of prior art "POLYCAST" molds to place a sheet of polyethylene film between the inboard side of disc 24 and the undersurface of mold clamp 206. This film acts like a mold release compound and also protects the rubber lid sealing component 236. The film is clamped between lid 206 and disc 24 (and the projections 238 of the lower mold part 202) and hence initially forms an imperforate barrier across the pour opening 290. However, when the reaction mixture is forced under the high injection pressure from the injection nozzles through funnel 312, the pressurized liquid material will puncture the polyethylene film, creating a small hole coaxial with pin 370 in the space immediately above the surface 384 of the screw head 376. The material thus flows through the film and radially outwardly over the deflected lip 386 of the silicon body 382 during pouring. Pin 370 functions in conjunction with this film to tend to hold the film in position during and after the pour so that the film itself also provides a natural weak point in the sprue stem 350 in the vicinity of the pour opening 290. By contrast, use of this polyethylene film with pin 330 has been found to produce a break which generates a flap in the film which tends to be pushed aside during the flow injection and does not return to its original position. Although this does not interfere with the aforementioned operation and improved results of sprue pin 330, the additional advantage of having the film produce a natural weak point in the sprue stem, as occurs with sprue pin 370, is not obtained with pin 330.

Referring to FIGS. 8 and 9, a fourth embodiment of mold apparatus and method in accordance with the invention is illustrated wherein the structure previously described is given like reference numerals, and structure similar in function and operation to that previously described is given a like reference numeral raised by a prime suffix. In this embodiment, the mold apparatus is modified to construct a so-called "wide-open-center" "POLYCAST" wheel design. Accordingly, lower mold part 202' is provided with an annular seal 400 adapted to seat against the crown of the hat section of disc 24 so that the mold cavity for the ornamental body 26' is disposed radially outwardly of seal 400, and extends out to the outer seal 224. Hence, with this design, a pour opening in the bolt circle region of the disc cannot be employed. Instead, in accordance with this embodiment of the invention, one of the vent holes 32' in the disc is employed as a radially remote pour opening for the mold cavity. A modified vent sealing pad 236' is provided on the upper mold part 206' which has a radially inwardly protruding arm 402 which extends radially inwardly over the inboard surface of disc 24 to surround a shortened nozzle 314' of the funnel 312'. Arm 402 has a runner channel 406 which communicates with nozzle passage 322' at its radially inner end, and extends along the inboard side of the disc, following the contour of the same, to a radially outer terminal portion which surrounds the disc valve opening 32'.

A modified core protrusion 238' is provided in conjunction with the selected disc vent-pour opening 32'. Protrusion 238' has a free end portion 410 which protrudes axially of the wheel assembly in an inboard direction through the disc opening 32', and is contoured on its upper edge to seat against the surface of runner channel 406 in the assembled condition of the mold. The side walls of protrusion 410 are contoured complimentarily to the side walls of the disc valve opening 32' to define therebetween an annular (generally rectangular) orifice opening which communicates with the radially outboard end of runner channel 406 and the mold cavity space in which body 26' is to be formed. Protrusion 410 thus is designed to function similar to core pin 330 to permit adequate in-flow of urethane reaction material into the mold cavity during the injection pour cycle, but to limit back-flow therefrom as gellation takes place. Upon separation of mold lid 206' from the rim and disc subassembly 22-24 the solidified urethane material occupying the runner passage 406 tends to cling to the pad 402 and to separate from disc 24. As this takes place, the weakened fracture line generated in the annular space between protrusion 410 and disc vent opening 32' will cause separation of the urethane material to occur in this weakness plane. Upon separation of the lower mold part 202' from the finished wheel, the urethane pocket 44' will remain as in the first embodiment.

By way of illustration and not by way of limitation, the following specifications have been found to provide successful performance and achievement of the objects of the invention in working examples of the present invention:

Sprue Pin 330

Internal diameter of disc pour opening 290—0.500"
Outside diameter of body 334—0.437",
Base diameter of nose 336—.250"
Axial length of nose 336—0.187"
Minimum radial distance between body 334 and inner periphery of opening 290—0.032"
Minimum radial distance between nose 336 and inner surface of passage 322—0.062"
Approximate injection pressure of liquid urethane reaction mixture entering funnel 312—Approx. 2000 p.s.i.
Inside diameter of passage 322—0.250"

Sprue Pin 370:

Diameter of body 382—0.625"
Axial length of body 382—0.4375"
Distance between screw head surface 384 and body lip surface 386—0.062"
Radial width of lip 386—0.03125"
Diameter of pour opening 290 for pin 370—0.313"

From the foregoing description, it will now be apparent that the present invention provides an improved mold apparatus and method for constructing "POLYCAST" composite metal and elastomer styled wheels which satisfies the aforementioned objects, resulting in reduced processing and material costs without thereby increasing the time required to injection fill the mold cavity. It is also to be understood that, although the foregoing description and drawings describe and illustrate in detail various successful working embodiments of the present invention, to those skilled in the art to which the present invention relates, the present disclosure will suggest many modifications and constructions as well as widely different embodiments and applications without thereby departing from the spirit and scope of the invention. The present invention, therefore, is intended to be limited only by the scope of the appended claims and the applicable prior art.

I claim:

1. A method for molding a composite styled wheel of the type comprising a metal part consisting of a metal disc and rim subassembly operable as metal street wheel when a pneumatic tire is mounted on said rim, and a decorative urethane plastic body permanently molded to the metal part at the outboard face thereof, utilizing molding apparatus comprising a base mold part configured to receive said metal wheel part thereagainst and having an annular lip adapted for sealing engagement against an annular portion of the outboard face of the metal wheel part radially outwardly of the center of the disc in the closed condition of said molding apparatus, the base mold part having a mold cavity surface to provide an ornamental configuration for the outboard face of the plastic body of the composite wheel, the mold cavity surface in the mold closed condition defining with at least part of the outboard face of the metal wheel part a mold cavity axially adjacent the outboard face of the metal wheel part, a clamp adapted to seat in the mold closed condition against the inboard face of the metal wheel part at least adjacent the outer perimeter of the disc for urging the metal wheel part into sealing engagement with the base mold part, the mold parts being axially separable from one another to open the molding apparatus and at clear said metal wheel part from the clamp and base mold parts, funnel means adapted for registry with a liquid urethane reaction mixture injection nozzle coupled with injection mixing apparatus, the funnel means having a nozzle passage registering with the inboard side of a pour opening in the disc in the closed condition of the mold, and sprue pin means affixed to the base mold part in juxtaposed relation to the disc pour opening, the sprue pin means being adapted to cooperate with the dics pour opening to define a restricted annular access opening to the mold cavity during the injection pour of the urethane reaction mixture, the sprue pin means being operable to restrict back-flow of the reaction material via the pour opening during gelation of the same in the cure cycle, the sprue pin means being adapted to cooperate with the disc in the vicinity if said pour opening to define a zone of weakness in the cured urethane reaction mixture operable to induce fracture in the weakness zone upon separation of the clamp funnel means from the metal part to thereby cause cleavage of the urethane reaction material adjacent the inboard surface of the metal part, wherein the wheel is molded pursuant to the following steps:
   (1) said middle wheel mold part is seated and located on said base mold part with the inboard side of said disc of said middle metal mold part exposed for access thereto,
   (2) a thin film mold release plastic in sheet form is next placed so as to overlie the inboard side of said disc of said middle metal mold part so as to cover said inboard side at least over and around the pour opening in said disc.
   (3) said clamp is seated in closed condition against the inboard face of said middle metal wheel mold part to urge said mold parts to closed condition with said thin film sheet clamped between said middle metal wheel mold part and said clamp,
   (4) said urethane reaction mixture in liquid form is injected via said funnel means under injection pressure to thereby rupture said thin film juxtaposed to said restricted access opening and thence flow into the mold cavity to fill the same, and
   (5) said urethane reaction mixture is allowed to cure sufficiently in said mold to permit demolding by separation of said mold parts whereby cleavage of the urethane reaction material occurs in the vicinity of the rupture zone in said thin film sheet.

2. The method as set forth in claim 1 wherein the sprue pin means utilized in said method comprises a cylindrical body made of soft flexible material, said body having a face juxtaposed to the outboard side of said disc of said middle mold part in the closed condition of said mold to contact or provide slight clearance therebetween in the free state condition of said body, the periphery of said body being exposed to and disposed within the mold cavity or a gate passageway leading thereto.

3. The method as set forth in claim 1 wherein said thin film sheet is utilized to cover substantially all of said inboard side of said disc.

4. The method as set forth in claim 2 wherein said soft flexible material is silicon rubber.

* * * * *